United States Patent [19]

Quinn et al.

[11] 4,068,740
[45] Jan. 17, 1978

[54] GEAR PUMP ASSEMBLY

[75] Inventors: Jerome B. Quinn, Kennett Square; Edward L. Heimark, King of Prussia, both of Pa.

[73] Assignee: Philadelphia Gear Corporation, King of Prussia, Pa.

[21] Appl. No.: 698,947

[22] Filed: June 23, 1976

[51] Int. Cl.² ............................................. F01M 9/10
[52] U.S. Cl. .................................. 184/6.12; 74/467; 184/11 R; 308/86; 415/88
[58] Field of Search .................. 184/6.12, 11 A, 11 R, 184/13 R; 74/467; 418/88, 91; 415/88, 110, 111; 308/86

[56] References Cited

U.S. PATENT DOCUMENTS

| 1,074,043 | 9/1913 | Breur | 415/88 X |
| 2,285,142 | 6/1942 | Bixby | 184/11 R |
| 2,419,905 | 4/1947 | Miess | 415/88 |
| 2,671,405 | 3/1954 | Stoors | 415/88 |
| 2,826,398 | 3/1958 | Norris | 415/88 X |
| 2,912,065 | 11/1959 | Moller | 184/13 R |
| 3,100,027 | 8/1963 | Harris et al. | 184/6.12 |
| 3,367,445 | 2/1968 | Dryden | 184/1 R |
| 3,444,960 | 5/1969 | Killius et al. | 74/467 X |

Primary Examiner—David H. Brown
Attorney, Agent, or Firm—Paul & Paul

[57] ABSTRACT

A gear train is housed in a gear box having upper and lower plates in or on which gear-shaft bearings are mounted. One of the gears functions as a centrifugal gear pump for projecting lubricating oil from a sump in the tank angularly upwardly through openings in the upper bearing-mounting plate to a deflecter plate located thereabove. This oil is deflected angularly downwardly and collected in a recessed area on the upper surface of the upper bearing-mounting plate. Bearing caps are provided with radial ports through which oil collected in the recessed area flows to the bearings and working parts before returning to the sump.

16 Claims, 4 Drawing Figures

Fig. 1

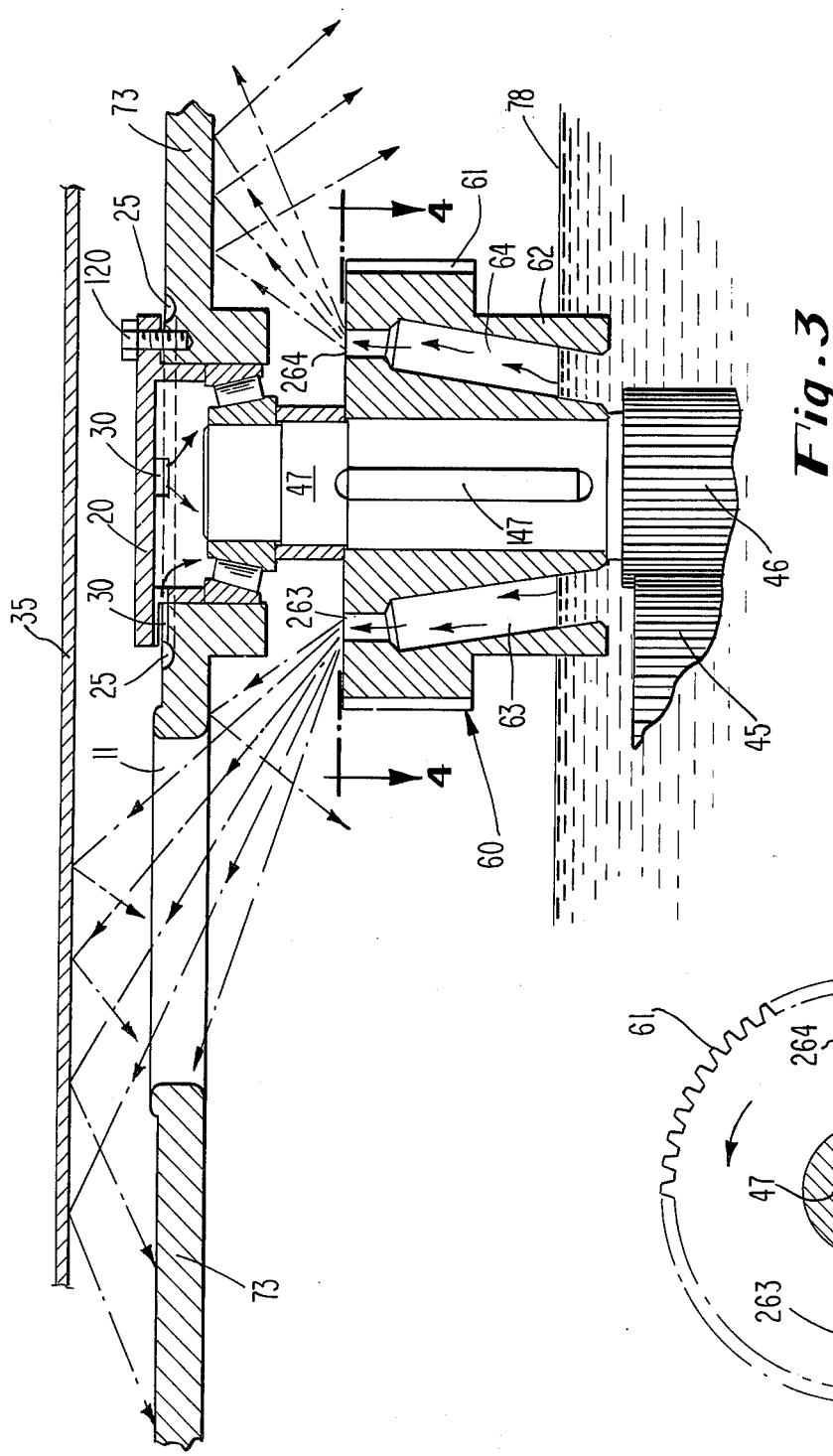
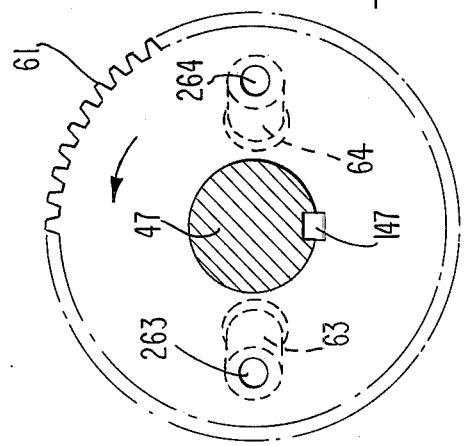

GEAR PUMP ASSEMBLY

BACKGROUND OF THE INVENTION

This invention relates to a gear box containing a gear train, a sump or reservoir of oil or other lubricant fluid, and means for distributing the lubricant to bearing and working surfaces within the gear box.

The invention relates particularly to a gear box assembly in which one of the gears is designed to also function as a centrifugal oil pump.

A one-piece gear pump is shown in Harris et al. U.S. Pat. No. 3,100,027. In the Harris et al patent, the gear pump has a lower body portion with a frusto-conical cavity for creating a pressure head. Unlike Harris et al, no frusto-conical cavity is employed in the gear pump of the present application, and the inclined passageways are in direct communication with the reservoir. Means are provided for collecting and distributing to the bearings and to the working surfaces of the gear train, the lubricating oil which is thrown radially outwardly and upwardly by the pump.

SUMMARY OF THE INVENTION

A principal object of the present invention is to provide a gear box containing a gear train, one of the gears of which functions as a pump for projecting oil or other lubricant fluid from a sump or reservoir upwardly through openings in the upper plate of the gear box, deflecting and collecting the fluid projected through the openings, and distributing it to bearings and working surfaces within the gear box.

BRIEF DESCRIPTION OF THE DRAWINGS

FIG. 1 is an elevational view, in section, looking along the line 1—1 of FIG. 2 showing a gear box containing a gear train which includes a gear pump and lubricant collection and distribution components according to the present invention.

FIG. 3 is an elevational view, in section, looking along the line of 3—3 of FIG. 2 illustrating the action of the gear pump assembly of the present invention.

FIG. 4 is a view of the gear pump looking down along the line 4—4 of FIG. 3.

DETAILED DESCRIPTION OF THE PREFERRED EMBODIMENTS

Figure 1:
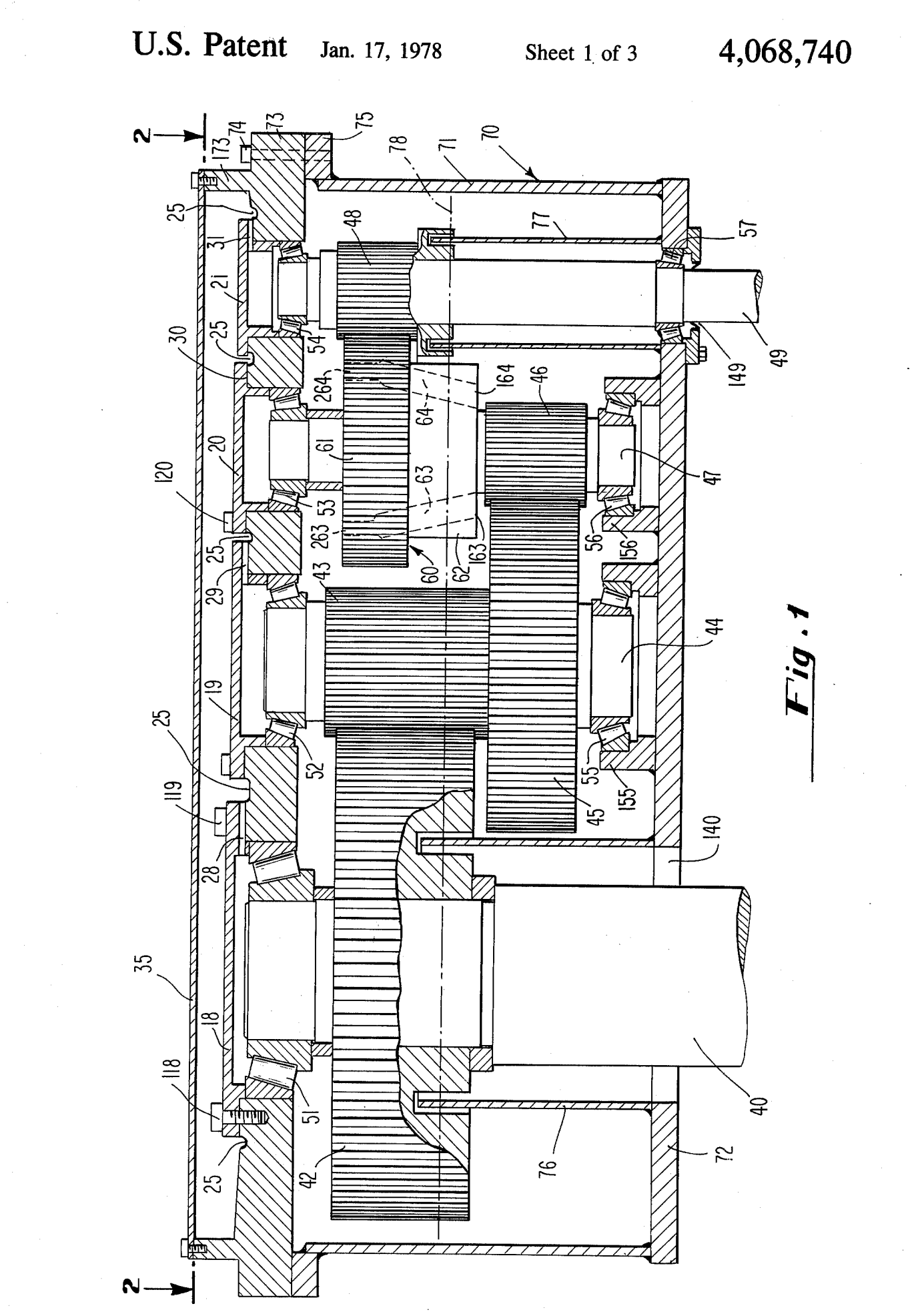
Figure 2:
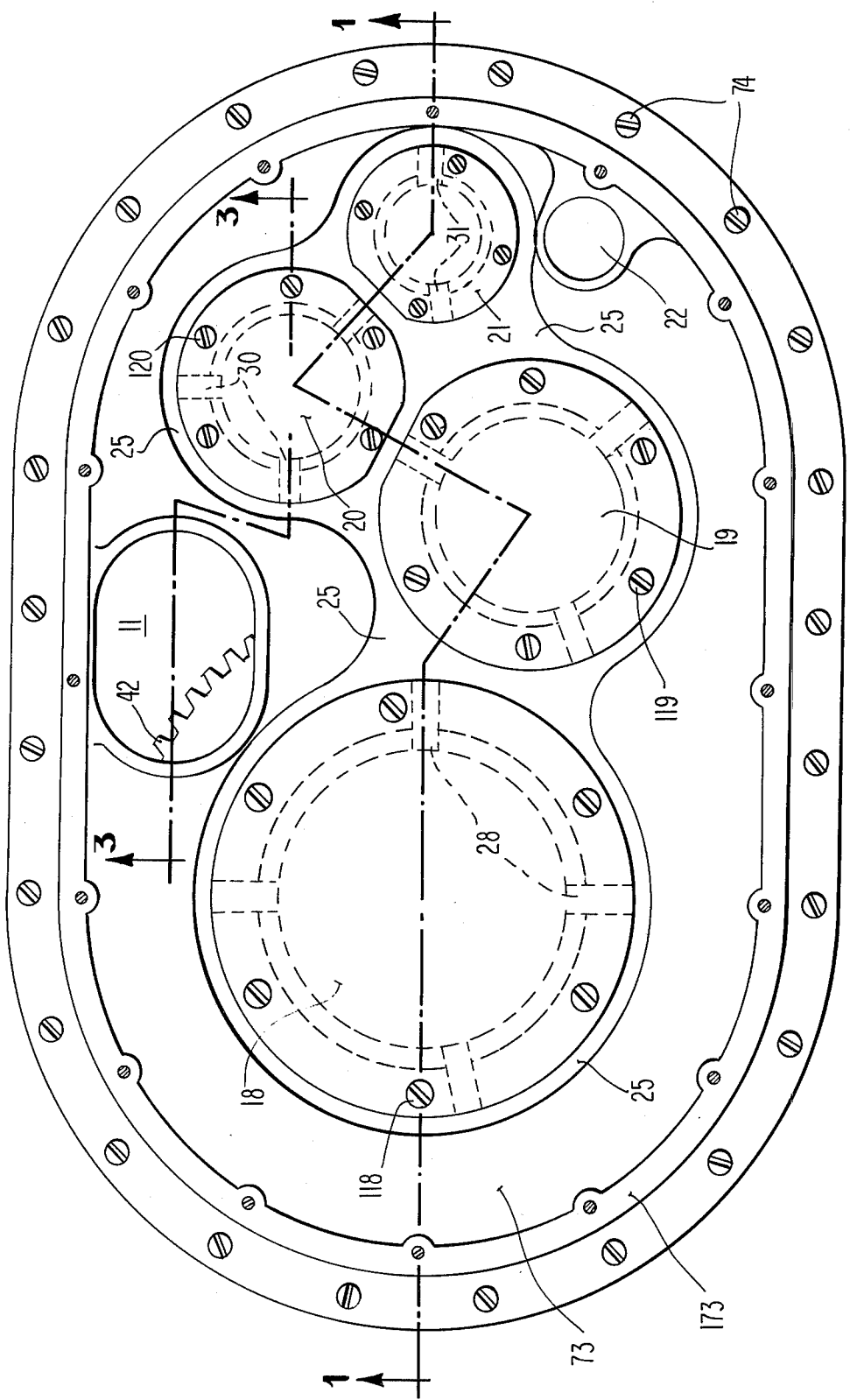
FIG. 2 is a top plan view looking down along the line 2—2 of FIG. 1.

Referring now to FIGS. 1 and 2, a gear box 70 is illustrated as having a generally oval wall 71, a lower plate 72 in which or on which lower bearings, such as 55–57 are mounted, and an upper plate 73 in which upper bearings, such as 51–54, are mounted. Upper plate 73 may be secured, as by bolts 74, to an outwardly projecting flange 75 which is secured, as by welding, to the wall 71. Lower plate 72 may be secured, as by welding, to wall 71. Lower plate 72 is provided with a pair of circular openings 149 and 140 for passage therethrough of the main drive input shaft 49 and the output or load shaft 40, respectively. Bearings 57, previously mentioned, are shown mounted in lower plate 72 at opening 149. These bearings support input shaft 49 and are separately lubricated, as by grease-gun fitting, not shown.

The upper end of input shaft 49 is supported in bearings 54 mounted in upper plate 73. The upper end of output shaft 40 is supported in bearings 51 also mounted in plate 73. The lower end of output shaft 40 is supported in bearings, not shown.

Surrounding the input and output shafts 49,40 at the openings 149,140 in lower plate 72, are upstanding collars 77 and 76 which are secured, as by welding, to the lower plate 72.

A reservoir or sump of lubricant liquid, such as oil, is contained in gear box 70 to the level of the dot-and-dash line 78 shown in FIG. 1. Collars 76 and 77, (which are shown welded to lower plate 72 but which may preferably be bolted thereto) project above the oil level 78 and are provided at their upper ends with suitable seals (not shown) thereby forming dry sinks for the output and input shafts. Since none of the oil of the reservoir reaches bearings 57 on input shaft 49, these bearings 57 may be separately lubricated, as by a grease-gun fitting, not shown.

Secured to lower plate 72, as by welding, are a pair of annular bearing mounts 155,156 for supporting bearings 55, 56. These bearings support the lower ends of a pair of stub shafts 44,47, respectively. The upper ends of stub shafts 44 and 47 are supported in bearings 52 and 53, respectively, mounted in upper plate 73.

In the gear box illustrated in the drawings, four circular openings are provided in upper plate 73. In these openings bearings 51, 52, 53, 54 are mounted for supporting the upper ends of the four shafts shown, 40,44,47 and 49. These openings are capped by circular bearing caps 18,19,20, 21 shown bolted to upper plate 73 as by bolts 118–121, respectively.

In addition to the four circular openings in which the four bearings 51–54 are mounted, upper plate 73 is also provided with additional openings for allowing lubricating oil from the reservoir to be thrown upwardly therethrough by the gear pump. Two such openings 11 and 22 are shown in the illustrated embodiment. Opening 11 is shown to be oval in shape, while opening 22 is shown to be circular. These configurations, as well as the number of such openings, may be varied as desired.

Supported above upper plate 73, as on an upstanding flange 173, is a deflection plate 35 whose function is to deflect downwardly lubricating oil thrown thereagainst by the gear pump. For the purpose of collecting and distributing the oil deflected by plate 35, the peripheral portions of the upper surface of the upper bearing-mounting plate 73 is inclined downwardly inwardly at a small angle, and the irregularly-shaped area in which the four circular openings for the shaft bearings 51–54 are located, identified 25, is recessed for collecting the oil directed thereto by the downwardly inclined peripheral surface of upper plate 73.

To direct the lubricating oil which collects in recess 25 to the bearings 51–54, each of the bearing caps 18–21 is provided with a plurality of radial ducts 28–31. Four such ducts at 90° spacing are shown for cap 18; three such ducts at 120° spacing are shown for caps 19 and 20; and two such ducts at 180° spacing are shown for cap 21.

In the particular gear train illustrated in the drawing, input shaft 49, driven at its lower end by a motor or other power means not shown, is provided at its upper end, with a gear 48 which drives a gear pump 60. Pump 60 has an upper portion 61 having gear teeth which mesh with gear 48, and a lower body portion 62 which is without teeth. Pump 60 is mounted on stub shaft 47 and secured thereto, as by key 147. Also mounted on and secured to stub shaft 47 is a gear 46 which is in mesh with and drives a gear 45 mounted on and secured to stub shaft 44. Also mounted on and secured to stub shaft 44 is a gear 43 which meshes with and drives a gear 42 mounted on and secured to output shaft 40.

Gear pump 60 is shown to be provided with two passageways 63 and 64. At least the lower portions of these passageways are inclined relative to the center axis of the gear. In the embodiment illustrated, the upper portions of the passageways 63,64 leading to the exit ports 263,264, are shown to be parallel with the center axis. However, this is not essential. In some applications, the passageways 63,64 may be inclined throughout their entire lengths. The exit ports 263,264 are preferably smaller in diameter or size than the intake ports 163,164 thereby to increase the pressure head which is developed within the inclined passageways.

The gear portion 61 of gear pump 60 is in mesh with and is driven by gear 48 which is mounted on and fixed to input shaft 49 journaled in bearings 54 and 57.

The gear train is shown and has been described as a speed reducer but could be a step-up speed changer, with shaft 40 being connected to the power drive and functioning as the input shaft, and shaft 49 being connected to the driven load. The gear pump 60, in either case, is seen to be mounted on one of the higher speed shafts. This is desirable.

OPERATION

The operation of the gear pump assembly of the present invention will be described with the aid of FIG. 3. Gear box 10 is filled with oil or other lubricating liquid to the level of the dot-and-dash line 78, thereby providing an oil sump. It is to be noted that in the particular arrangement illustrated in FIG. 1, gear 45 and gear 46 are completely immersed in the sump, that gear 42 and gear 43 are partially immersed, that the lower untoothed portion 62 of gear pump 60 is partially immersed, that the upper gear portion 61 of pump 60 is not immersed, and neither is the gear 48. Bearings 55 and 56 are immersed. Bearing 57 is specially lubricated, as by a grease gun. Bearings 51–54 are well above the oil level 78 and are lubricated by gear pump action, as will be described.

When the gear pump member 60 is driven rotationally, preferably at relatively high speed, a pressure head is developed in the inclined passageways 63,64 which forces oil upwardly through the passageways and out of the exit ports 263,264. This pressure head, and the resultant upward movement of oil through passageways 63 and 64, result from the centrifugal force which drives the sump oil against the immersed portion of the radially-outwardly-inclined wall of each of the passageways 63,64. Since these immersed portions are inclined radially outwardly upwardly, the centrifugal force on the oil generates a reaction force having a upward component of sufficient magnitude to force oil upwardly through the passageways and radially outward and upward from the exit ports 263,264. This action is indicated by the dot-and-dash arrowed lines in FIG. 3. The diameter of exit ports 263,264 is preferably smaller than the diameter of intake ports 163, 164, so as to increase the upward force on the oil ejected therefrom. In the illustration, the uppermost portions of passageways 63,64 are shown to be of smaller diameter and disposed parallel with the center axis of the gear pump member 60. These features are not, however, essential.

In one embodiment of the invention which has been built and tested, the intake ports 163,164 have a diameter of 1 inches while the exit ports have a diameter of ½ inches. The angle of inclination of the passageways 63,64 is in the 30°–45° range, relative to the center axis. The gear pump 60 rotates at 300–350 r.p.m. These values are given as an example of a workable device, and are not intended to be limiting.

As indicated diagrammatically in FIG. 3, some of the oil which is ejected from ports 263,264 strikes the undersurface of the bearing-support plate 73 and is deflected downwardly, lubricating whatever bearings and gear teeth are in the path of the oil as it returns to the sump. Some additional means must, however, be provided for lubricating the more remote bearings and gear teeth, such, for example, as bearings 51. Such means, according to the present invention, include the provision of openings 11 and 22 in the bearing-support plate 73, the oil-collection recess 25 in the plate 73, and the radial ports 28–31 in the bearing caps 18–21.

In FIG. 3, opening 22 in plate 73 is not visible; only opening 11 is visible. As indicated in FIG. 3, oil projected through opening 11 is deflected downwardly by deflection plate 35 and is received on the downwardly-inwardly-inclined peripheral portion of the surface of plate 73. This oil drains down into the recess 25, and through the radial ports 28,29,30 and 31 to the bearings 51,52,53 and 54, and to the teeth of gears 42,43,61 and 48.

What is claimed is:
1. A gear train assembly comprising:
    a. a gear box containing a reservoir of lubricant fluid;
    b. a speed-changing train of gears within said gear box;
    c. a plurality of parallel shafts vertically disposed within said gear box on which gears of said gear train are mounted in intermeshing relationship;
    d. one of said gears on one of said shafts being adapted to function as a gear pump;
    e. said gear pump comprising an upper body portion provided with gear teeth and a lower body portion having no gear teeth;
    f. said lower body portion being partially immersed in said reservoir of lubricant fluid;
    g. at least two passageways extending generally vertically through said lower and upper body portions but inclined outwardly upwardly;
    h. each of said passageways terminating in an intake port at the lower surface of the lower body portion and terminating in a discharge port at the upper surface of the upper body portion;
    i. said gear box having upper and lower plates for mounting bearings for said shafts;
    j. said upper bearing-mounting plate being provided with a plurality of openings, one opening in alignment with each shaft;
    k. bearings mounted in each of said openings for supporting the upper ends of the shafts;
    l. a cap covering each of said bearing-mounting openings;
    m. at least one additional opening in said upper bearing-mounting plate for passage therethrough of lubricant fluid projected angularly upwardly by said pump, said additional opening not being in alignment with the gear-pump shaft;
    n. a deflection plate above said upper bearing-mounting plate for deflecting angularly downwardly lubricant fluid projected angularly upwardly through said additional opening;
    o. the upper surface of said upper bearing-mounting plate being provided with a recessed area in which said plurality of bearing-mounting openings are located;
p. the peripheral portions of the upper surface of said upper bearing-mounting plate being inclined downwardly inwardly toward said recessed area;
q. said caps being provided with ports for passage of lubricant fluid from said recessed area to said bearings mounted in said openings.

2. Apparatus according to claim 1 wherein:
a. said discharge ports of said gear-pump passageways are of smaller size than said intake ports.

3. Apparatus according to claim 1 wherein:
a. said gear-pump passageways are inclined radially outwardly upwardly.

4. Apparatus according to claim 1 wherein:
a. said cap ports are radially disposed.

5. Apparatus according to claim 1 wherein:
a. said gear pump is mounted on a shaft which operates at higher speed than at least one other shaft of said gear train.

6. Apparatus according to claim 1 wherein:
a. said upper bearing-mounting plate is provided with at least two additional openings for passage of lubricant fluid projected angularly upwardly by said gear pump.

7. Apparatus according to claim 1 wherein:
a. the uppermost portions of said gear-pump passageways are parallel with the center axis of said gear pump.

8. Apparatus according to claim 3 wherein:
a. said uppermost portions of said passageways are of smaller diameter than the lower inclined portions.

9. A gear train assembly comprising:
a. a gear box adapted for containing a sump of lubricant fluid;
b. a speed-changing train of gears within said gear box;
c. a plurality of parallel shafts at least portions of which are vertically disposed within said gear box and on which gears of said gear train are mounted in intermeshing relationship;
d. one of said gears on one of said shafts being adapted to function as a gear pump;
e. the lower body portion of said gear pump adapted to be partially immersed in said sump;
f. at least two passageways extending angularly vertically through said gear pump, said passageways being inclined outwardly upwardly;
g. each of said passageways terminating in an intake port at the lower surface of the lower body portion and terminating in a discharge port at the upper surface of the upper body portion;
h. said gear box having upper and lower plates for mounting bearings for said shafts;
i. said upper bearing-mounting plate being provided with a plurality of openings in alignment with a corresponding shaft;
j. bearings mounted in said openings for supporting the upper ends of the shafts;
k. caps covering said bearing-mounting openings;
l. at least one additional opening in said upper bearing-mounting plate for passage therethrough of lubricant fluid projected angularly upwardly by said pump, said additional opening being located remote from the axes of the shafts;
m. a deflection plate above said upper bearing-mounting plate for deflecting angularly downwardly lubricant fluid projected angularly upwardly through said additional opening;
n. the upper surface of said upper bearing-mounting plate being provided with a recessed area in which said bearing-mounting openings are located;
o. the peripheral portions of the upper surface of said upper bearing-mounting plate being inclined downwardly inwardly toward said recessed area;
p. at least one of said caps being provided with ports for passage of lubricant fluid from said recessed area to said bearings mounted in the opening.

10. A gear train assembly comprising:
a. a gear box containing a reservoir of lubricant fluid;
b. a train of gears within said gear box;
c. a plurality of shafts within said gear box on which at least some of the gears of said gear train are mounted;
d. a member on one of said shafts adapted to function as a centrifugal pump;
e. said pump member having a lower body portion partially immersed in said reservoir of lubricant fluid;
f. at least one passageway extending through said pump member inclined outwardly upwardly;
g. said passageway terminating in an intake port at the lower surface of the pump member and terminating in a discharge port at the upper surface of said pump member;
h. said gear box having an upper plate;
i. said upper plate being provided with openings in alignment with said shafts;
j. bearings mounted in said openings for supporting the upper ends of the shafts;
k. caps covering said openings;
l. at least one additional opening in said upper plate for passage therethrough of lubricant fluid which is projected angularly upwardly by said pump member;
m. the upper surface of said upper plate being provided with a recessed area in which said openings for said bearing mountings are located;
n. said caps being provided with ports for passage of lubricant fluid from said recessed area to bearings mounted in said openings.

11. Apparatus according to claim 10 wherein:
a. a deflection plate is mounted above said upper plate for deflecting angularly downwardly lubricant fluid projected angularly upwardly through said additional opening.

12. Apparatus according to claim 10 wherein:
a. said pump member also functions as one of said gears of said gear train.

13. Apparatus according to claim 12 wherein:
a. at least two passageways extend through said pump member inclined upwardly outwardly.

14. Apparatus according to claim 10 wherein:
a. at least two passageways extend through said pump member inclined upwardly outwardly.

15. Apparatus according to claim 14 wherein:
a. a deflection plate is mounted above said upper plate for deflecting angularly downwardly lubricant fluid projected angularly upwardly through said additional opening.

16. Apparatus according to claim 15 wherein:
a. the peripheral portion of the upper surface of said upper plate is inclined downwardly inwardly toward said recessed area.

* * * * *